United States Patent [19]
Takimoto

[11] Patent Number: 5,301,071
[45] Date of Patent: Apr. 5, 1994

[54] RECORDING AND REPRODUCING APPARATUS USING A BIDIRECTIONAL LINE TO RECEIVE AND TRANSMIT SIGNALS

[75] Inventor: Hiroyuki Takimoto, Kanagawa, Japan

[73] Assignee: Canon Kabushiki Kaisha, Tokyo, Japan

[21] Appl. No.: 310,297

[22] Filed: Feb. 13, 1989

[30] Foreign Application Priority Data

Feb. 22, 1988 [JP] Japan .................. 63-039830

[51] Int. Cl.⁵ .............................................. G11B 15/12
[52] U.S. Cl. ............................................ 360/61; 360/62
[58] Field of Search ............... 360/61, 62, 14.1, 15, 360/33.1; 369/2, 19; 358/311, 335

[56] References Cited

U.S. PATENT DOCUMENTS 3,922,641 11/1975 Gates, Jr. .................. 358/335
4,031,548 6/1977 Kato et al. .................. 358/335

OTHER PUBLICATIONS

*IEEE Standard Dictionary of Electrical and Electronics Terms,* Jay editor, (no month) 1984, p. 955.
*Communications Standard Dictionary,* Weik editor, (no month) 1983, p. 863.
*The Radio Amateur's Handbook,* "A Transmitting Converter For 1.8 MHZ.," DeMaw editor, 47th. ed., (no month) 1970, pp. 285–288.

Primary Examiner—Donald Hajec
Assistant Examiner—Non Tae C. Kim
Attorney, Agent, or Firm—Robin, Blecker, Daley & Driscoll

[57] ABSTRACT

A recording and reproducing apparatus includes a recording and reproducing part for recording and reproducing a signal on and from a recording medium, a connection terminal for connection with the outside, and a manually operable operation part for designating one of different modes of the recording and reproducing part. The apparatus is arranged to selectively use the connection terminal as an input terminal for receiving a recording signal or as an output terminal for outputting a reproduced signal.

19 Claims, 4 Drawing Sheets

RECORDING AND REPRODUCING APPARATUS USING A BIDIRECTIONAL LINE TO RECEIVE AND TRANSMIT SIGNALS

BACKGROUND OF THE INVENTION

1. Field of the Invention

This invention relates to a recording and reproducing apparatus and more particularly to an apparatus which is capable of receiving an external recording signal and externally outputting a reproduced signal.

2. Description of the Related Art

Apparatuses of the above-stated kind include, for example, VTRs. Among the VTRs, the so-called camera-incorporating type VTR which incorporates a camera therein has become popular. The camera-incorporating type VTR is generally arranged to record and reproduce by a VTR part thereof a signal obtained from a camera part thereof. The VTR is, however, sometimes arranged to be capable of recording a video signal externally received.

The VTR of this kind is provided with input terminals for receiving a video signal and an audio signal and output terminals for outputting video and audio signals. In addition to these terminals, the VTR is also provided with a selection switch for allowing the user to select a recording signal from between a signal produced by the camera part and a signal externally received. However, the recording and reproducing apparatus of this kind has too many input and output terminals for reduction in size and weight of the apparatus. This presents a problem as it is important for the camera-incorporating type VTR to be compact in size and light in weight. It is another problem of the VTR that an unaccustomed user tends to fail to check the position of the selection switch to see which of the input signals is being selected for recording. For example, the VTR may be intended to be operated for recording an image of an object while the position of the selection switch, which may be unnoticed, is on the side of selecting an external input. In that event, an image recording chance would be missed.

To solve these problems, it has been attempted to provide a VTR with a small connector especially for the above-stated purpose in place of four connection terminals employed for the purpose. That VTR, however, necessitates the use of some additional cable for connection with a TV receiver set or the like, and thus results in a very inconvenient and expensive system as a whole.

SUMMARY OF THE INVEVTION

It is a general object of this invention to solve the above-stated problems of the prior art.

It is a more specific object of the invention to provide a compact, light-weight recording and reproducing apparatus which permits an easy operation by the user and can be manufactured at a low cost.

Under this object, a recording and reproducing apparatus arranged according to this invention as an embodiment thereof comprises a connection terminal for electrically connecting the apparatus to external devices, recording and reproducing means for recording a signal on a recording medium and for reproducing a signal from the recording medium, manual operation means for designating one of a plurality of modes of the recording and reproducing means, the plurality of modes including a recording mode in which the signal is recorded on the recording medium and a reproducing mode in which the signal is reproduced from the recording medium, and terminal switching means for selectively connecting the connection terminal to an input side of or an output side of the recording and reproducing means in response to an operation of the manual operation means.

It is another object of the invention to provide a low-cost compact apparatus which is capable of recording signals generated within and externally of the apparatus.

Under that object, a recording apparatus which is arranged according to the invention as another embodiment thereof comprises a connection terminal for electrically connecting the apparatus to the exteriorly thereof, generating means for generating a recording signal, switching means for selectively outputting the signal generated by the generating means or a signal received by the connection terminal, recording means for recording the signal output from the switching means on a recording medium, and supply means for supplying the signal generated by the generating means to the connection terminal while the switching means is outputting the signal generated by the generating means.

The above and other objects and features of the invention will become apparent from the following detailed description of embodiments thereof taken in connection with the accompanying drawings.

DETAILED DESCRIPTION OF THE PREFERRED EMBODIMENTS

The following describes the details of this invention through preferred embodiments thereof.

Figure 1:
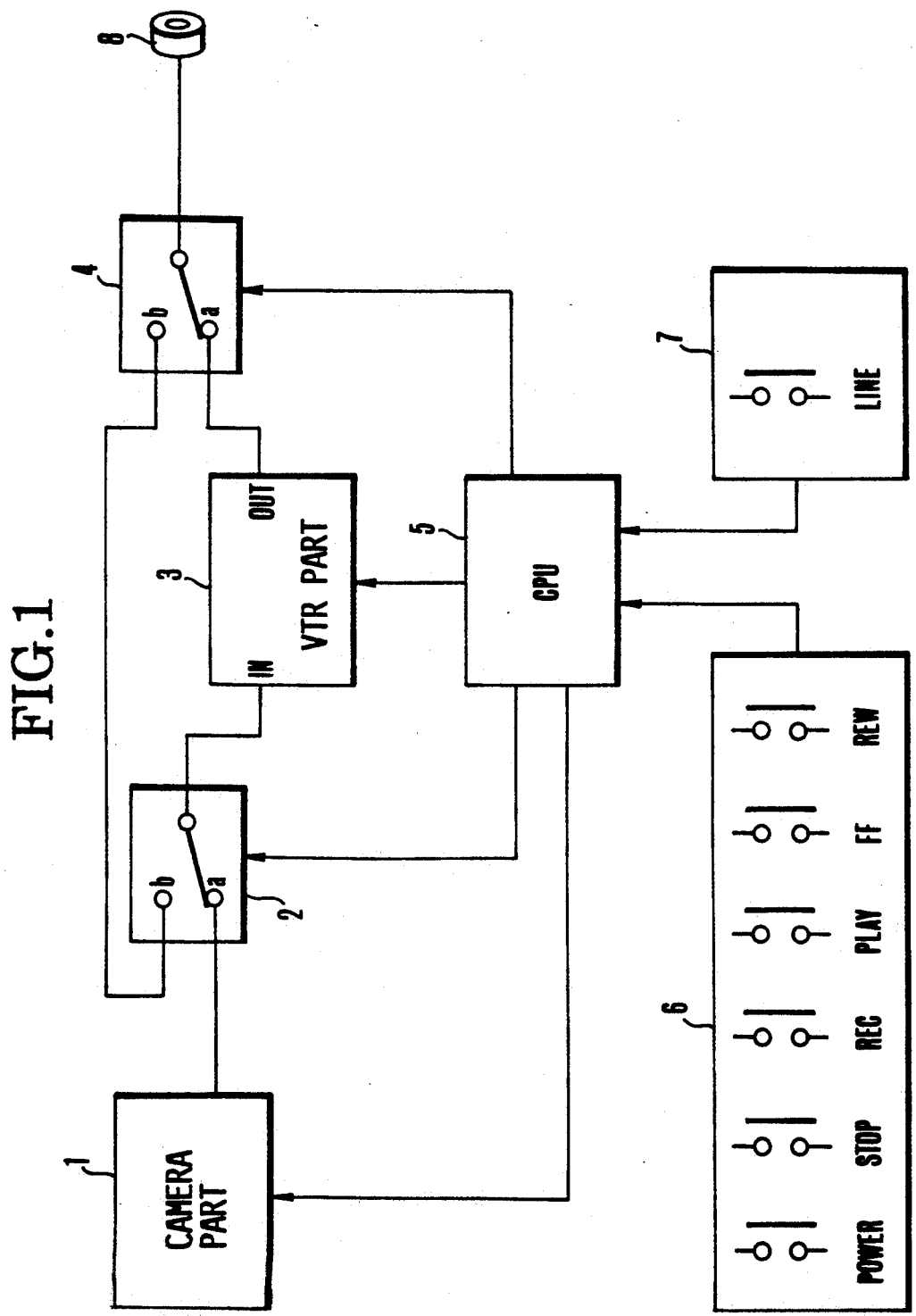
FIG. 1 is a diagram showing in outline a camera-incorporating type VTR which is arranged according to this invention as an embodiment thereof.

Referring to FIG. 1, the illustration includes a camera part 1; a selection switch 2 which is arranged to selectively output a video signal coming from a camera part 1 or a video signal coming from an external connection terminal 8 which will be described later; and a VTR part 3 which is arranged to record or reproduce a video signal output from the selection switch 2. The VTR part 3 is composed of a known mechanism and a known electronic circuit. A symbol IN denotes a video signal input part and a symbol OUT a video signal output part. A selection switch 4 is arranged to select the use of the external connection terminal 8 between the use of the terminal 8 as a line input terminal and the use of it as a video output terminal. A micro-processor (CPU) 5 is arranged to control the various parts of the VTR. A key input part 6 is arranged to permit the user to select a desired mode of the VTR. The key input part 6 includes a power supply switch POWER; a stop switch STOP; a recording switch REC; a reproduction switch PLAY; a fast forwarding switch FF; and a fast rewinding switch REW. An anti-lock type selection key (LINE) 7 is manually operable and is arranged to permit selection of the source of the signal to be recorded by the VTR part 3 from between an external input from the camera part 1 and an input. The external connection terminal 8 is, for example, a pin jack terminal and is provided for connecting the VTR to an external device. The selection switches 2 and 4 are arranged to have their selecting positions shifted by the CPU 5.

Figure 2:
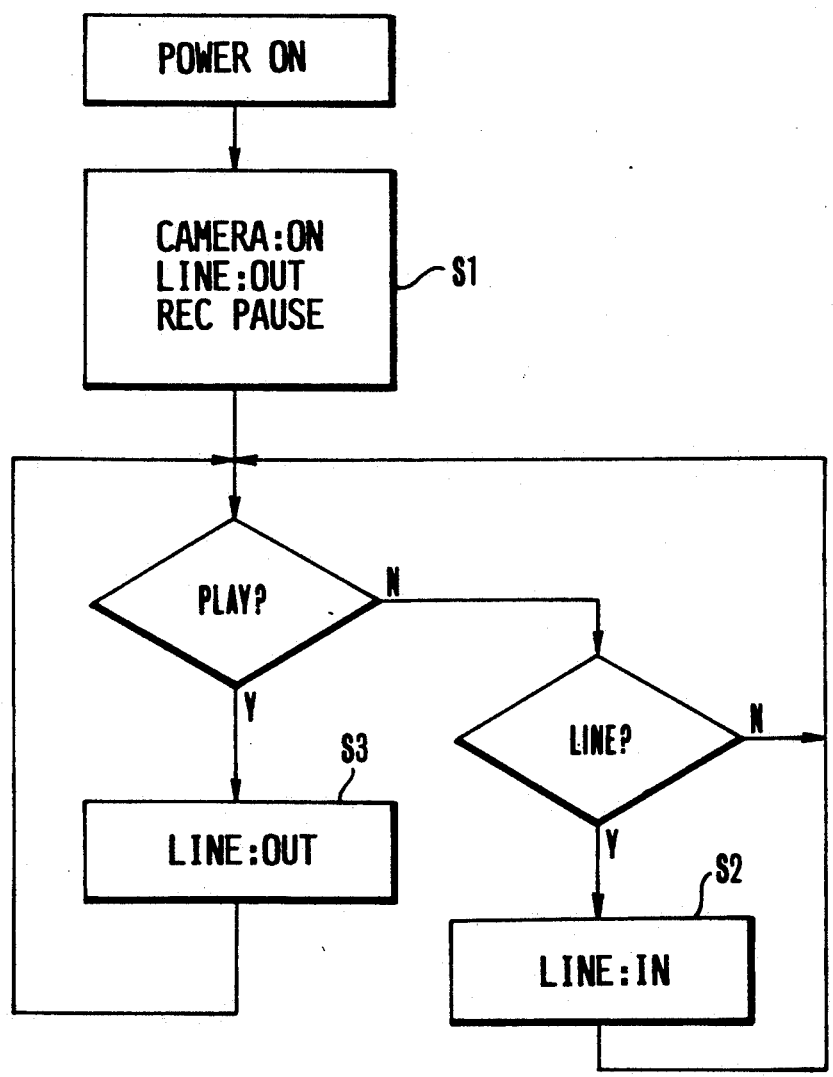
FIG. 2 is a flow chart showing the operation of a CPU which is included in FIG. 1.

The embodiment operates as described below with reference to the flow chart of FIG. 2:

When the power supply switch POWER is turned on (POWER ON), the CPU 5 causes a power supply to be effected to the camera part 1 and the VTR part 3 respectively. Each of the selection switches 2 and 4 is then connected to one side "a", as shown in FIG. 1. Under this condition, the video signal output from the camera part 1 is supplied to the input part IN of the VTR part 3 via the side "a" of the selection switch 2. The video signal output from the VTR part 3 is supplied to the external connection terminal 8 via the side "a" of the selection switch 4. In FIG. 2, a step S1 shows the setting actions to be performed in the above-stated manner. The video signal generated by the camera part 1 is output as it is from the VTR part 3. Thus, the so-called image recording monitor output is output from the terminal 8.

In the case of the camera-incorporating type VTR of this embodiment, the VTR part 3 is set in a state of standing ready for image recording (REC pause) by the CPU 5. The VTR can be set in a desired mode by operating each applicable key of the key input part 6 under this condition. Further, in setting the VTR in the recording mode, a pause cancel key which is not shown is triggered.

For example, when the selection key (LINE) 7 is pushed in a pause mode, the CPU 5 shifts the connecting positions of both the selection switches 2 and 4 to their sides "b". As a result, the terminal 8 is connected to the part IN of the VTR part 3. This brings the VTR part 3 into a state of being capable of recording a video signal received from the outside. This action is as shown at a step S2 of FIG. 2. The VTR part 3 records this video signal when the recording switch REC is operated.

When the reproduction switch PLAY of the key input part 6 is turned on, the CPU sets the VTR part 3 in a reproduction mode. At the same time, the connecting positions of both the selection switches 2 and 4 are set on their sides "a". This allows a reproduced video signal to be supplied from the VTR part 3 to the external connection terminal 8. In FIG. 2, a step S3 shows this switching action.

Further, the VTR can be arranged to be shiftable to a state of recording a camera input by operating the selection key (LINE) 7 once again while an external input is being received, for example, in a pause mode.

Further, although an audio signal handling arrangement is omitted from the illustration of the embodiment, the VTR of course can be arranged to allow an audio signal to be received and output through an external connection terminal in the same manner as a video signal. In that case, the external connection terminal for an audio signal can be arranged in the same manner as in the case of the external connection terminal provided for a video signal. With a camera incorporating type VTR arranged as described above according to this invention, the VTR is not only capable of recording a video signal received from the outside but also permits the number of the external connection terminals of the prior art to be reduced by half. It thus permits reduction in size and cost of the VTR. Further, when the power supply is switched on, the VTR is automatically readied for recording a video signal coming from the camera part. When the VTR is changed from an external input recording state over to a reproducing state, the VTR automatically outputs a reproduced video signal from the external connection terminal. This arrangement enables even an unaccustomed user to operate the VTR simply and without any trouble.

Figure 3:
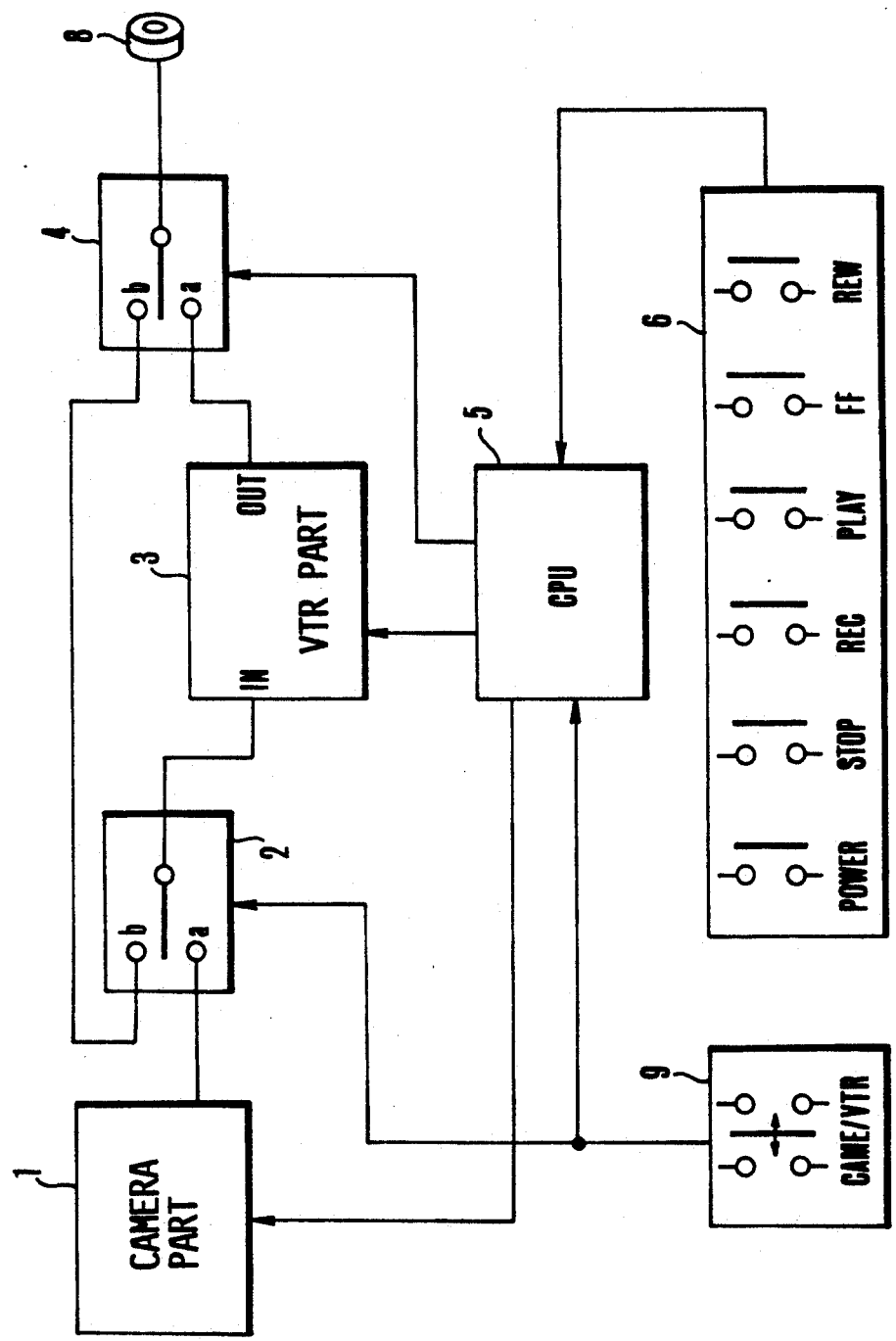
FIG. 3 is a diagram showing in outline a camera-incorporating type VTR which is arranged as another embodiment of the invention.
Figure 4:
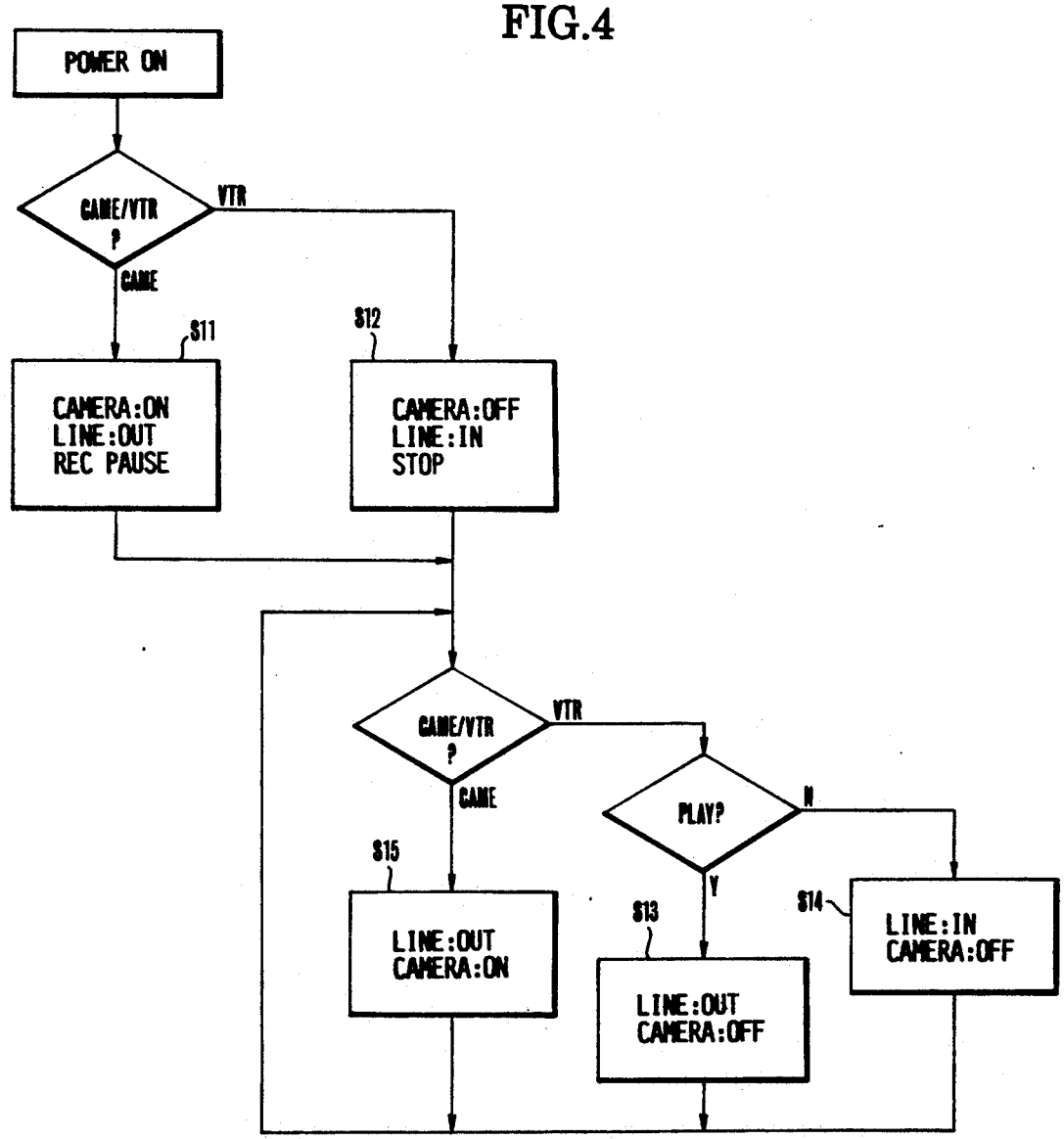
FIG. 4 is a flow chart showing the operation of a CPU which is included in FIG. 3.

FIG. 3 shows a camera-incorporating type VTR arranged according to the invention as a second embodiment thereof. FIG. 4 is a flow chart showing the operation of a CPU 5 included in FIG. 3. In FIG. 3, reference numerals 1 to 8 denote component parts which are the same as the parts 1 to 8 of FIG. 1 and, therefore, details thereof are omitted from the following description. A reference numeral 9 denotes an input switch of the lock type. In the case of this specific embodiment, the input switch 9 is arranged to take one of two positions CAME and VTR. The connecting position of the switch 2 is arranged to be on one side "a" when the input switch 9 is in the position CAME and to be on the other side "b" when the switch 9 is in the other position VTR.

When the power supply switch POWER of the key input part 6 is turned on while the input switch 9 is on the side CAME, the CPU 5 causes the power to be supplied to the camera part 1 and the VTR part 3, respectively. The connecting position of the switch 4 is set on its one side "a". As a result, the VTR becomes ready for image recording in the same manner as in the case of the first embodiment described in the foregoing. In FIG. 4, this action is shown at a step S11. After that, the VTR can be set in any desired mode by operating the key input part 6.

Where the switch 9 is on the side of its position VTR, when an instruction for a power supply is given from the key input part 6, the CPU 5 causes the power to be supplied to the VTR part 3 but not to the camera part 1. The connecting position of the selection switch 4 is then set on its other side "b".

In this instance, the VTR part 3 is automatically set in a pause mode. In FIG. 4, this setting action is shown at a step S12. When a video signal is supplied to the terminal 8 under this condition, the signal is supplied to the input part IN of the VTR part 3 via the side "b" of the switch 4 and the side "b" of the switch 2. Then, when the recording switch REC is turned on under this condition, the signal is recorded by the VTR part 3.

Further, when the stop switch STOP is operated and, following it, the reproduction switch PLAY is also operated at the key input part 6, the VTR part 3 is set in the reproduction mode. In that instance, the CPU 5 sets the position of the switch 4 on its side "a" to allow a reproduced video signal to be supplied to the terminal 8. In FIG. 4, this change-over action is shown at a step S13. In the reproduction mode thus obtained, when the stop switch STOP is operated at the key input part 6, the VTR part 3 comes into a stop mode. The CPU 5 then brings the position of the switch 4 back to the other side "b". In FIG. 4, this change-over action is shown at a step S14.

Further, when the input switch 9 is shifted to its position CAME in this stop mode, the CPU 5 causes the power to be supplied to the camera part 1 and also shifts the position of the switch 4 to its one side "a". In FIG. 4, that change-over action is shown at a step S15.

In the second embodiment described, the action of the VTR part 3 to be performed when the power supply is switched on is variable by means of the input selection switch 9. The way in which the terminal 8 is to be used is automatically variable accordingly. Further, the way in which the terminal 8 is to be used is also automatically changes according to the mode set by the key input part 6. This arrangement enables an unaccustomed user to operate the VTR with ease. The arrangement of the embodiment thus greatly enhances the operability of the VTR.

As apparent from the foregoing description, a recording and reproducing apparatus according to this invention not only permits reduction in size and weight thereof but also excels in operability.

What is claimed is:

1. An information signal recording and reproducing apparatus comprising:
    a) a common terminal for inputting an external information signal and externally outputting an internal information signal;
    b) a connection line arranged to connect with said common terminal and to be able to transmit signals in a bidirectional manner;
    c) recording and reproducing means for recording an information signal on a recording medium and for reproducing an information signal from the recording medium;
    d) manual operation means for designating one of a plurality of modes of said recording and reproducing means, said plurality of modes including a recording mode in which the information signal is recorded on the recording medium and a reproduction mode in which the information signal is reproduced from the recording medium; and
    e) terminal switching means for selectively connecting said connection line to an input side or an output side of said recording and reproducing means in response to an operation of said manual operation means.

2. An apparatus according to claim 1, wherein said manual operation means includes a reproduction key for setting said recording and reproducing means into said reproduction mode, and wherein said terminal switching means is arranged to connect said connection line to the output side of said recording and reproducing means in response to an operation of said reproduction key.

3. An apparatus according to claim 1, further comprising a power supply switch for supplying electric power to each part of said apparatus, and wherein said terminal switching means is arranged to connect said connection line to the output side of said recording and reproducing means in response to commencement by said power supply switch of supply of power to each part of said apparatus.

4. An apparatus according to claim 1, further comprising generating means for generating a recording signal, and recording switching means for selectively connecting said generating means or said connection line to the input side of said recording and reproducing means.

5. An apparatus according to claim 4, wherein said terminal switching means connects said connection line to the input side of said recording and reproducing means while said recording switching means connects said connection line to the input side of said recording and reproducing means.

6. An apparatus according to claim 4, wherein said terminal switching means connects said connection line to the output side of said recording and reproducing means while said recording switching means connects said generating means to the input side of said recording and reproducing means.

7. An apparatus according to claim 4, further comprising a manual operation key arranged separately from said manual operation means, and wherein said terminal switching means is arranged to change a then existing connection in response to an operation of said manual operation key.

8. An apparatus according to claim 7, wherein said terminal switching means is arranged to respond to an operation of said manual operation key in preference to an operation of said manual operation means.

9. An apparatus according to claim 7, wherein said terminal switching means is arranged to respond to an operation of said manual operation key in preference to an operation of said manual operation key.

10. An apparatus according to claim 9, wherein said manual operation key selectively takes a first or second condition, and wherein said recording switching means connects said generating means to the input side of said recording and reproducing means and said terminal switching means connects said connection line to the output side of said recording and reproducing means when said manual operation key takes said first condition.

11. An apparatus according to claim 10, wherein said recording switching means and said terminal switching means change state in response to an operation of said manual operation means when said manual operation key takes said second condition.

12. An information signal recording and reproducing apparatus comprising:
    a) a common terminal for inputting an external information signal and externally outputting an internal information signal;
    b) a connection line arranged to connect with said common terminal and to be able to transmit signals in a bidirectional manner;
    c) recording and reproducing means for recording an information signal on a recording medium and for reproducing an information signal from a recording medium;
    d) terminal switching means for selectively connecting said connection line to an input side or an output side of said recording and reproducing means;
    e) generating means for generating said internal information signal; and
    f) recording switching means for selectively connecting said generating means or said connection line to the input side of said recording and reproducing means, said terminal switching means and said recording switching means being arranged to operate in association with each other.

13. An apparatus according to claim 12, wherein said terminal switching means connects said connection line to the input side of said recording and reproducing means while said recording switching means connects said connection line to the input side of said recording and reproducing means.

14. An apparatus according to claim 12, wherein said terminal switching means connects said connection line to the output side of said recording and reproducing means while said recording switching means connects said generating means to the input side of said recording and reproducing means.

15. An information signal recording and reproducing apparatus comprising:
    a) a common terminal for inputting an external information signal and externally outputting an internal information signal;
    b) connection line arranged to connect with said common terminal and to be able to transmit signals in a bidirectional manner;
    c) recording and reproducing means for recording an information signal on a recording medium and for reproducing an information signal from the recording medium;
    d) a power supply switch for supplying electric power to each part of said apparatus; and
    e) terminal switching means for selectively connecting said connection line to an input side or an output side of said recording and reproducing means, said terminal switching means being arranged to connect said connection line to the output side of said recording and reproducing means in response to commencement by said power supply switch of supply of power to each part of said apparatus.

16. An apparatus according to claim 15, further comprising manual operation means for designating one of a plurality of modes of said recording and reproducing means, said plurality of modes including a recording mode in which the information signal is recorded on the recording medium and a reproducing mode in which the information signal is reproduced from the recording medium, said terminal switching means being arranged to selectively connect said connection line to the input side or the output side of said recording and reproducing means in response to an operation of said manual operation means.

17. An information signal recording apparatus comprising:
    a) a common terminal for inputting an external information signal and externally outputting an internal information signal;
    b) a connection line arranged to connect with said common terminal and to be able to transmit signals in a bidirectional manner;
    c) generating means for generating said internal information signal;
    d) switching means for selectively outputting the internal information signal generated by said generating means or the external information signal received through said connection line;
    e) recording means for recording on a recording medium a signal output from said switching means; and
    f) supply means for supplying the internal information signal generated by said generating means to said common terminal through said connection line while said switching means is outputting the internal information signal generated by said generating means.

18. An information signal recording and reproducing apparatus comprising:
    a) a common terminal for inputting an external information signal and externally outputting an information signal;
    b) a connection line arranged to connect with said common terminal and to be able to transmit signals in a bidirectional manner;
    c) recording and reproducing means for recording an information signal on a recording medium and for reproducing an information signal from the recording medium;
    d) switching means for selectively connecting said connection line to an input side or an output side of said recording and reproducing means; and
    e) a power supply switch for supplying electric power to each part of said apparatus, and wherein said switching means is arranged to connect said connection line to the input side of said recording and reproducing means in response to commencement by said power supply switch of supply of power to each part of said apparatus.

19. An information signal recording apparatus comprising:
    a) a common terminal for inputting an external information signal and externally outputting an internal information signal;
    b) a connection line arranged to connect with said common terminal and to be able to transmit signals in a bidirectional manner;
    c) generating means for generating said internal information signal;
    d) recording means for recording a signal on a recording medium; and
    e) switching means for switching over whether said common terminal is to be used for outputting the internal information signal generated by said generating means or to be used for receiving the external information signal.

* * * * *